United States Patent
Elsik et al.

Patent Number: 5,550,180
Date of Patent: Aug. 27, 1996

[54] "ALUMINA THICKENED LATEX FORMULATIONS"

[75] Inventors: Cutis M. Elsik, Austin; Ronald L. Beggs, Leander, both of Tex.

[73] Assignee: Condea Vista Company, Houston, Tex.

[21] Appl. No.: 348,757

[22] Filed: Dec. 2, 1994

Related U.S. Application Data

[63] Continuation of Ser. No. 140,267, Oct. 21, 1993, abandoned.

[51] Int. Cl.$^6$ .............. C08J 5/10; C08K 3/18; C08K 3/22; C08L 33/10
[52] U.S. Cl. .............. 524/430; 524/445; 524/446; 524/444; 524/43; 524/44
[58] Field of Search .............. 524/43, 44, 430, 524/445, 446, 444

[56] References Cited

U.S. PATENT DOCUMENTS

| | | | |
|---|---|---|---|
| 3,595,822 | 7/1971 | Swenk | 260/29.6 R |
| 4,117,105 | 9/1978 | Hertzenberg et al. | 423/625 |
| 4,544,408 | 10/1985 | Mosser et al. | 106/14.12 |
| 4,571,415 | 2/1986 | Jordon | 524/428 |
| 4,913,840 | 4/1990 | Evans et al. | 252/313.2 |

OTHER PUBLICATIONS

"DISPAL® Alumina as a Thickener in Latex Paints," *CSL Tech. Service Bulletin*, D-7-70, Jun. 23, 1978.

*Primary Examiner*—Paul R. Michl
*Assistant Examiner*—U. K. Rajguru
*Attorney, Agent, or Firm*—Browning, Bushman, Anderson & Brookhart

[57] ABSTRACT

A latex composition comprising, as a rheology modifier, an effective amount of a boehmite alumina having a crystal size (020 plane) of less than about 60 Angstroms and a surface area, when calcined to gamma phase, of greater than approximately 200 $m^2/g$, the boehmite alumina being present in an amount effective to obtain the desired rheological properties of the composition.

9 Claims, 5 Drawing Sheets

"ALUMINA THICKENED LATEX FORMULATIONS"

This is a continuation of U.S. application Ser. No. 08/140,267, filed on Oct. 21, 1993 now abandoned.

BACKGROUND OF THE INVENTION

1. Field of the Invention

The present invention relates to thickened latex compositions and, more particularly, thickened latex paint compositions.

2. Description of the Prior Art

Water-based latex paints and coatings (latex compositions) are widely used in industrial and residential applications. In order to perform properly, these latex compositions must be able to be applied uniformly to horizontal (top and bottom), vertical, and even intricately shaped objects with a minimum tendency to run. Such performance requires rheology control during and after application of the latex compositions. Typically, latex compositions can be applied by one of several methods, including spraying, brushing or applying by means of a roller. Accordingly, rheology control of the compositions must be such as to allow alternate methods of application. Additionally, since the formulations are all suspensions of solids, e.g., pigments, in liquid, the rheology must be controlled during production as well as during storage to prevent undue settling and separation of the components of the formulation.

It is well known that organic thickeners such as hydroxyethyl cellulose (HEC) can be used to thicken water-based latex compositions. Additionally, certain clays that are known to act as thixotropes in water solutions are also used, alone or in conjunction with HEC, as thickening agents. More recently, there have been developed what are known as "Associative Thickeners," which are generally synthetic polymeric materials dispersed in water-compatible (-miscible) liquids.

It is well known that monohydrated aluminas, e.g., boehmite aluminas, can be used as thickeners for simple aqueous solutions. For example, the prior art discloses the use of such boehmite aluminas as thickeners in aqueous cleaning formulations.

SUMMARY OF THE INVENTION

It is therefore an object of the present invention to provide a thickened, water-based latex composition employing an alumina thickening agent that exhibits shear thinning.

Still a further object of the present invention is to provide a water-based latex paint composition that exhibits superior clean-up properties.

The above and other objects of the present invention will become apparent from the drawings, the description given herein and the appended claims.

The present invention provides a thickened latex composition comprising, as a rheology modifier, a boehmite alumina in an amount effective to obtain the desired rheological properties of the composition. The boehmite aluminas that are useful in the compositions of the present invention are those possessing a crystallite size (020 plane) of less than about 60 Angstroms and a surface area, when calcined, of greater than approximately 200 $m^2/g$.

DESCRIPTION OF THE PREFERRED EMBODIMENTS

Figure 1:
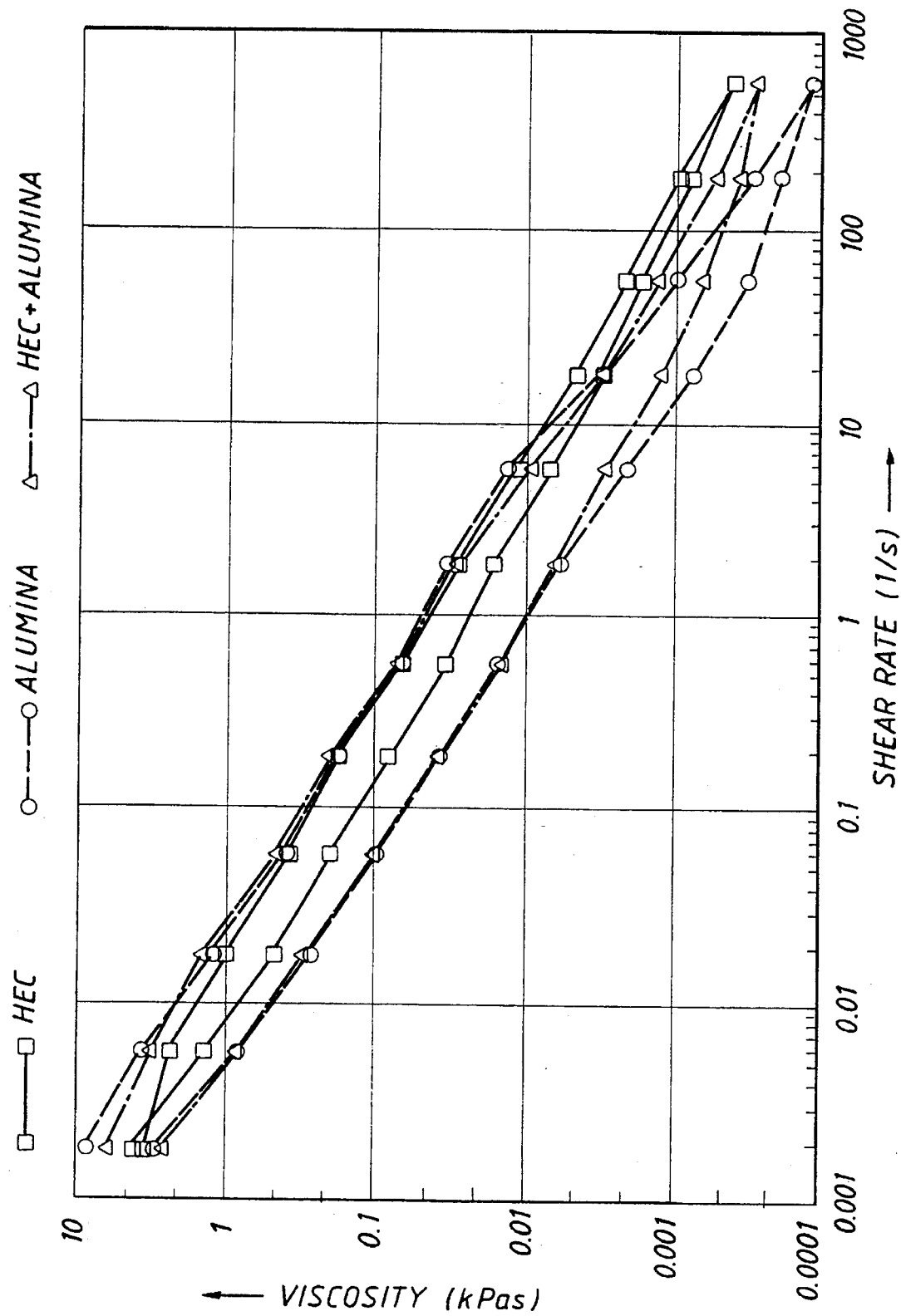
FIG. 1 is a Bohlin rheology graph showing the effect of various thickeners used in an Interior Quality Flat Wall Paint.

As noted, the present invention finds particular application to latex compositions. Such latex compositions are well known to those skilled in the art. The term "latex composition," as used herein, refers to a composition in which a binder comprising small globules or particles that are natural or synthetic rubber or plastic are dispersed in water. An example of such latex compositions are what are commonly referred to as emulsion paints or latex paints. Non-limiting examples of such synthetic rubber or plastic materials include styrene-butadiene rubber; polyvinyl acetate; copolymers of vinyl acetate with monomers such as butyl acrylate, octyl acrylate, dibutyl fumarate, dioctyl maleate, vinyl propionate, etc.; and polyacrylate polymers and copolymers such as copolymers of ethyl acrylate and a suitable alkyl methacrylate. Generally speaking, latex compositions of the type under consideration will contain from about 10% to about 90% of the latex binder or vehicle (including water) and an amount of from about 90% to about 10% by weight of other well-known components or ingredients such as pigments, e.g., titanium dioxide, calcium carbonate, etc. Additionally, latex paint compositions commonly contain thickeners, surfactants, antifreeze agents, preservatives, biocides, coalescent aids, pH adjustors, antifoam agents, etc. Commonly, latex paints of the type under consideration will contain the pigments in amounts of from about 10% to about 70% by weight of the composition.

The boehmite alumina thickener that is useful in the thickened compositions of the present invention can comprise any boehmite alumina that has a crystal size, as measured on the 020 plane, of less than about 60 Angstroms and a surface area, when calcined to the gamma phase, of greater than approximately 200 $m^2/g$. In determining the surface area of the useful boehmite aluminas, typically the boehmite alumina is calcined at a temperature of from about 450° to about 500° C. for a period of time of from about 1 to about 5 hours. Such calcining generally converts the boehmite alumina into gamma alumina. It is to be understood, however, that when used as the thickener or rheology modifier in the compositions of the present invention, the alumina is used as the boehmite form of alumina, i.e., in its uncalcined form. Generally speaking, the boehmite alumina will be present in an amount effective to obtain the desired rheological properties of the composition. For example, depending upon the type and angle (relative to the horizontal) of the surface to which a latex paint is applied, the desired rheological properties of the composition can vary widely, and accordingly the amount of thickener employed can vary widely. Generally speaking, however, and particularly when used in a latex paint, the boehmite alumina thickener will be present in an amount of from about 0.1% to about 5% by weight of the composition. It is particularly preferred, although not necessary, that the boehmite alumina employed be of the water-dispersible type, i.e., of a type that does not require acid for dispersibility.

To more fully illustrate the present invention, the following non-limiting examples are presented. In the following examples, the latex paints were prepared in a two-step manner commonly used in the commercial preparation of paint formulations. In the "grind" step, pigments and ingredients required for dispersion are added and mixed at high shear rates. In the "letdown" step, the resins and other heat- or shear-sensitive components are added and mixed at lower shear rates. In the grind step, the components were combined and dispersed at approximately 2000 feet/min (agitator tip speed) on a laboratory Cowles dissolver using a 1.5" Cowles blade. The letdown ingredients were added and blended at a lower agitator tip speed until uniformly mixed. Various viscosity measurements were made using a Brookfield Viscometer or a Bohlin VOR Rheometer.

EXAMPLE 1

This example shows the use of a water-dispersible alumina as a total and partial replacement for HEC in an Interior (modified-acrylic) Good Quality Flat Wall Paint. The formulations are shown in Table 1 below.

TABLE 1

| | HEC | | ALUMINA | | HEC + ALUMINA | |
|---|---|---|---|---|---|---|
| Batch Size: | <Quart | | <Quart | | 100 Gal. Formula | |
| Ingredient: | Grams | w/w % | Grams | w/w % | Lbs | w/w % |
| PIGMENT GRIND | | | | | | |
| DI Water | 181.84 | 22.73 | 100.00 | 12.50 | 170.00 | 14.78 |
| DISPERSAL SOL P2[1] | | | 5.76 | 0.72 | 4.14 | 0.36 |
| NATROSOL 250 HBR[2] | 3.84 | 0.48 | | | 2.76 | 0.24 |
| Nuosept 145[3] | 1.84 | 0.23 | 1.84 | 0.23 | 2.64 | 0.23 |
| Propylene Glycol | 21.12 | 2.64 | 21.12 | 2.64 | 30.35 | 2.64 |
| NDW[4] | 1.36 | 0.17 | 1.36 | 0.17 | 1.95 | 0.17 |
| Triton X-100[5] | 2.96 | 0.37 | 2.96 | 0.37 | 4.25 | 0.37 |
| Tamol 731[6] | 5.84 | 0.73 | 5.84 | 0.73 | 8.39 | 0.73 |
| AMP-95[7] | 2.96 | 0.37 | 2.96 | 0.37 | 4.25 | 0.37 |
| Ti-Pure R-931[8] | 106.08 | 13.26 | 106.08 | 13.26 | 152.44 | 13.26 |
| CACO$_3$ #1 White | 87.60 | 10.95 | 87.60 | 10.95 | 125.89 | 10.95 |
| ASP-NC29 | 51.12 | 6.39 | 51.12 | 6.39 | 73.46 | 6.39 |
| LETDOWN | | | | | | |
| NDW | 1.36 | 0.17 | 1.36 | 0.17 | 1.95 | 0.17 |
| Texanol[10] | 14.64 | 1.83 | 14.64 | 1.83 | 21.04 | 1.83 |
| UCAR Acrylic 516[11] | 317.44 | 39.68 | 317.68 | 39.70 | 456.53 | 39.70 |
| DI Water | | | 79.92 | 9.99 | 89.85 | 7.81 |
| TOTAL | 800.00 | 100.00 | 800.24 | 100.00 | 1149.89 | 100.00 |

[1]Water-dispersible boehmite alumina marketed by Condea Chemie G.m.b.H.
[2]Hydroxyethyl cellulose, marketed by Aqualon.
[3]Heterocyclic amine (preservative), marketed by Huls America Inc.
[4]A defoamer marketed by Henkel Corp.
[5]Nonionic surfactant (aklylaryl polyether alcohols), marketed by Union Carbide.
[6]Anionic polymeric dispersing agent, marketed by Rohm and Haas.
[7]Amino methyl propanol, marketed by Angus Chemical Co.
[8]Titanium dioxide, 80% min. (SiO, + Al$_2$O$_3$), marketed by DuPont.
[9]Aluminum silicate, marketed by Engelhard.
[10]Ester alcohol, marketed by Eastman Chemical.
[11]Acrylic-vinyl chloride modified latex marketed by Union Carbide.

FIG. 1 shows Bohlin rheology plots for the formulations of Table 1. As can be seen, the boehmite alumina can be used to replace HEC completely or partially and still maintain similar viscosity profiles for the overall formulation. As can also be seen, the formulations containing the alumina are more shear thinnable than those containing only HEC. This is an important factor when paint formulations are applied by means of spraying since it obviates the necessity of having to dilute the formulations.

EXAMPLE 2

This example demonstrates the use of boehmite alumina as a total replacement for a clay thickener and as a partial replacement for an Associative Thickener in a High Quality Interior Flat Paint (vinyl-acrylic). The formulations are shown in Table 2 below.

TABLE 2

|  | | QR 708 + ATTAGEL 40 | | QR 708 + ALUMINA | |
|---|---|---|---|---|---|
|  | Batch Size:<br>Ingredient | 100 Gal. Formula<br>Lbs. | w/w % | 100 Gal. Fomula<br>Lbs. | w/w % |
|  | PIGMENT GRIND | | | | |
|  | DI Water | 130.0 | 11.34 | 120.0 | 10.53 |
|  | DISPERAL SOL P2 | | | 8.20 | 0.72 |
|  | Tamol 960[1] | 10.0 | 0.87 | 10.0 | 0.88 |
|  | Nuosept 145 | 2.0 | 0.17 | 2.0 | 0.18 |
|  | Colloid 640[2] | 2.0 | 0.17 | 2.0 | 0.18 |
|  | AMP-95 | 2.0 | 0.17 | 2.0 | 0.18 |
|  | Ti-Pure R-900[3] | 200.0 | 17.45 | 200.0 | 17.55 |
|  | Satintone Special[4] | 125.0 | 10.91 | 125.0 | 10.97 |
|  | Min-U-Sil 40[5] | 75.0 | 6.54 | 75.0 | 6.58 |
|  | Attagel 40[6] | 7.0 | 0.61 | | |
|  | LETDOWN | | | | |
|  | Colloid 640 | 0.4 | 0.35 | 4.0 | 0.35 |
| PREMIX | Texanol | 10.0 | 0.87 | 10.0 | 0.88 |
| Add | Propylene Glycol | 25.0 | 2.18 | 25.0 | 2.19 |
| Before | DI Water | 16.7 | 1.46 | | |
| Latex | QR-708[7] | 16.0 | 1.40 | 10.3 | 0.90 |
|  | UCAR Latex 367[8] | 350.0 | 30.54 | 350.0 | 30.72 |
|  | DI Water | 171.3 | 14.95 | 196.0 | 17.20 |
|  | TOTAL | 1146.0 | 100.00 | 1139.5 | 100.0 |

[1]Anionic polymeric dispersing agent, marketed by Rohm and Haas.
[2]Amorphous silicas in a petroleum hydrocarbon carrier (defoamer), marketed by Rhone-Poulenc.
[3]Titanium dioxide, 80% min. ($SiO_2$ + $Al_2O_3$), marketed by DuPont.
[4]Aluminum silicate, marketed by Engelhard.
[5]Silicon dioxide, marketed by U.S. Silica.
[6]Magnesium aluminum silicate, marketed by Engelhard.
[7]Nonionic Associative Thickener containing 25% non-volatile solids and butyl carbitol/water, 25/75, marketed by Rohm and Haas.
[8]Vinly-acrylic latex marketed by Union Carbide.

Figure 2:
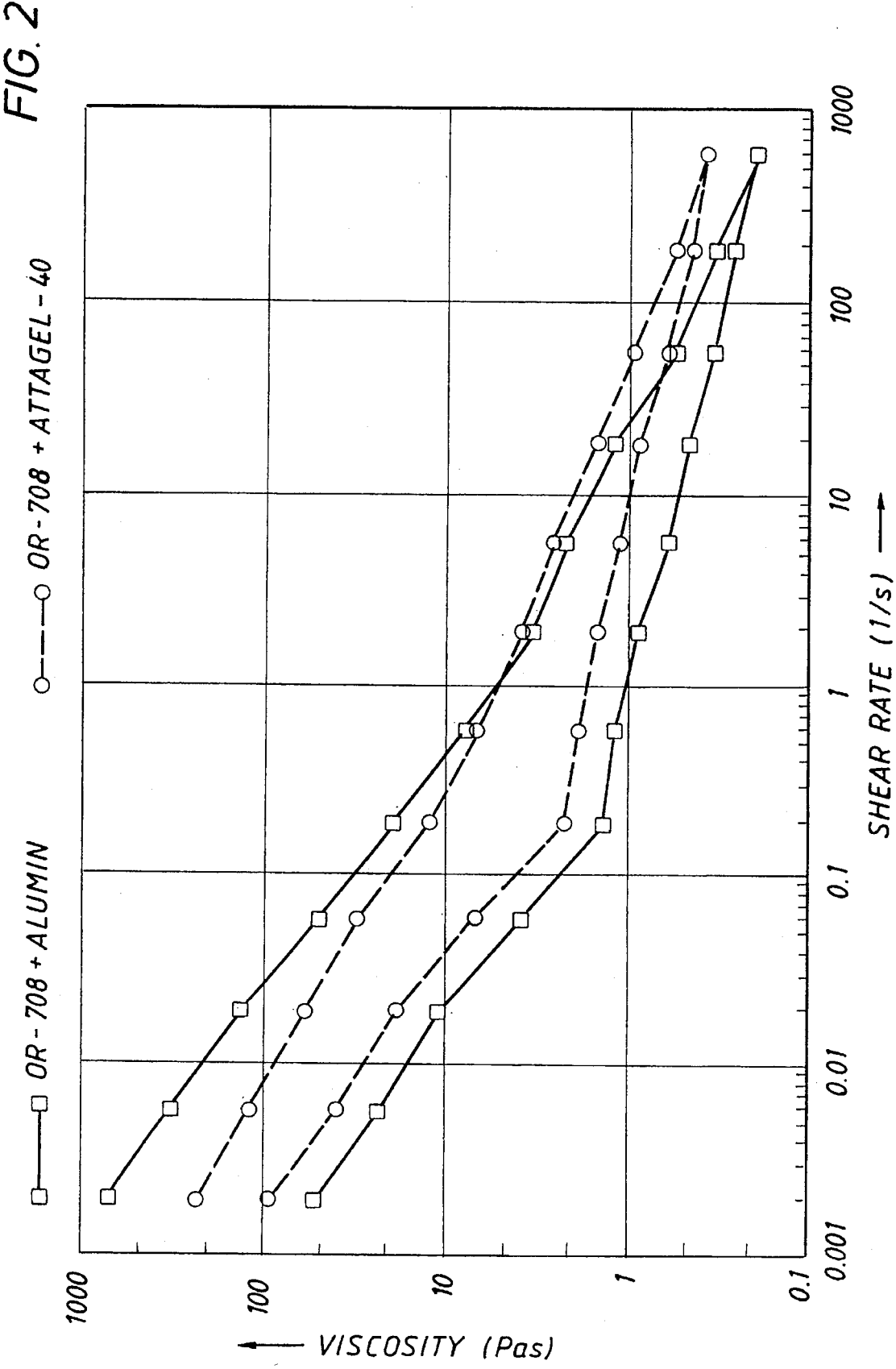
FIG. 2 is a Bohlin rheology graph showing the effect of various thickeners used in a High Quality Interior Flat Paint (vinyl-acrylic).

FIG. 2 shows Bohlin rheology curves comparing the formulations of Table 2. As can be seen, the alumina can be used to completely replace the clay thickener and partially replace the Associative Thickener while maintaining similar viscosity profiles for a formulation containing clay thickener and Associative Thickener. As can further be seen, the formulation containing the alumina exhibits better shear thinning characteristics than the formulation without any alumina.

EXAMPLE 3

This example demonstrates that boehmite alumina can be used as a partial replacement for HEC in an Exterior (modified-acrylic) Quality House Paint—White. The formulations are shown in Table 3 below.

TABLE 3

|  | HEC | | HEC + ALUMINA | |
|---|---|---|---|---|
| Batch Size:<br>Ingredient | 100 Gal.<br>Formula<br>Lbs. | w/w % | 100 Gal.<br>Formula<br>Lbs. | w/w % |
| PIGMENT GRIND | | | | |
| DI Water | 242.2 | 20.53 | 242.2 | 20.52 |
| DISPERAL SOL P2 | | | 2.6 | 0.22 |
| CELLOSIZE QP-15,000[1] | 3.5 | 0.30 | 1.8 | 0.15 |
| Byk VP-155[2] | 9.1 | 0.77 | 9.1 | 0.77 |
| Triton N-101[3] | 2.0 | 0.17 | 2.0 | 0.17 |
| Colloid 640 | 0.9 | 0.08 | 0.9 | 0.08 |
| KTPP[4] | 1.0 | 0.08 | 1.0 | 0.08 |
| Nuosept 145 | 2.0 | 0.17 | 2.0 | 0.17 |
| Nuocide 960[5] | 7.0 | 0.59 | 7.0 | 0.59 |
| Propylene Glycol | 28.0 | 2.37 | 28.0 | 2.37 |
| Ti-Pure R-900 | 250.0 | 21.19 | 250.0 | 21.18 |
| Minex 7[7] | 150.0 | 12.72 | 150.0 | 12.71 |
| Optiwhite[7] | 50.0 | 4.24 | 50.0 | 4.24 |
| LETDOMN | | | | |
| UCAR Acrylic 516 | 412.6 | 34.98 | 412.6 | 34.95 |

TABLE 3-continued

| | HEC | | HEC + ALUMINA | |
|---|---|---|---|---|
| Batch Size: Ingredient | 100 Gal. Formula Lbs. | w/w % | 100 Gal. Formula Lbs. | w/w % |
| Texanol | 16.9 | 1.43 | 16.9 | 1.43 |
| Colloid 640 | 2.6 | 0.22 | 2.6 | 0.22 |
| Ammonium Hydroxide, 28% | 1.8 | 0.15 | 1.8 | 0.15 |
| TOTAL | 1179.6 | 100.0 | 1180.5 | 100.00 |

[1]Hydroxyethyl cellulose, marketed by Union Carbide.
[2]Acrylic acid copolymer, sodium salt made by BYK Chemie USA.
[3]Nonionic surfactant (alkylaryl polyether alcohols), marketeded by Union Carbide.
[4]Potassium tripolyphosphate, marketed by Albright & Wilson Amer.
[5]Chlorinated aromatic nitrile marketed by Huls America Inc.
[6]Nepheline syenite (Na, K aluminum silicate), marketed by Unimin Canada Ltd.
[7]Calcined kaolin clay, marketed by Burgess Pigment Co.

Figure 3:
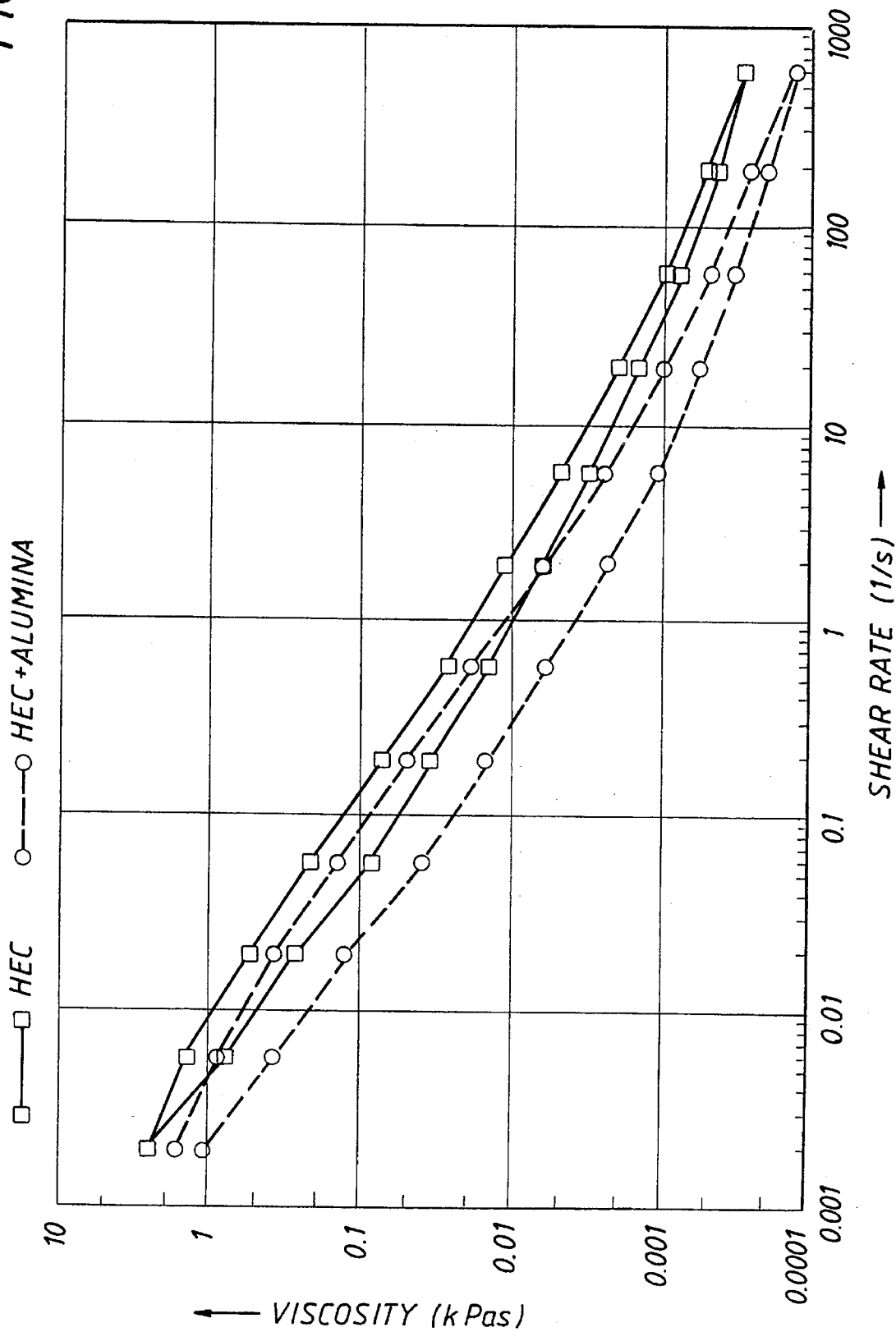
FIG. 3 is a Bohlin rheology graph showing the effect of various thickeners in an Exterior (modified-acrylic) Quality House Paint—White.
Figure 4:
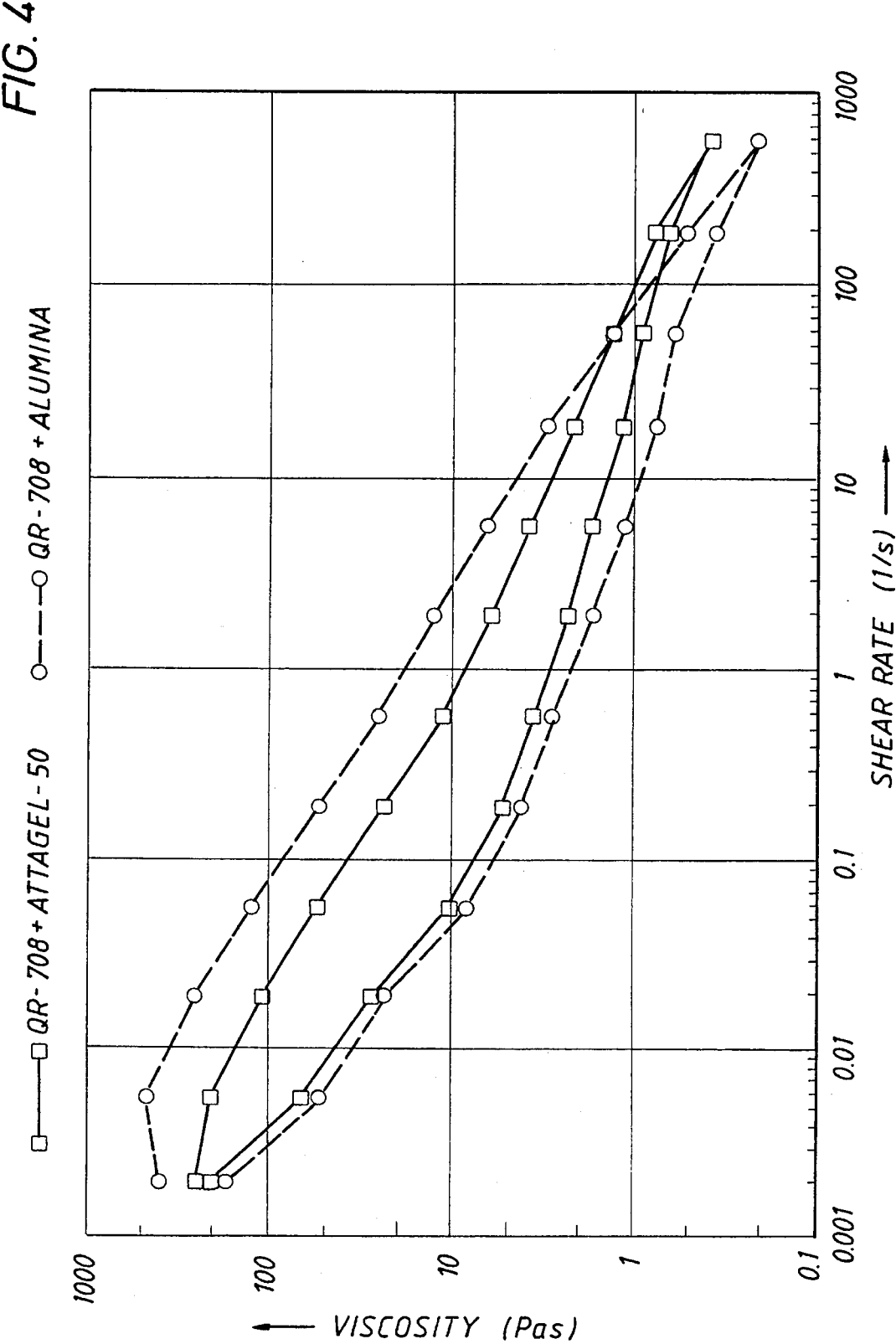
FIG. 4 is a Bohlin rheology graph showing the effect of various thickeners in an Exterior (modified-acrylic) Quality High Build House Paint—White.

The Bohlin rheology plots for the formulations of Table 3 are shown in FIG. 3. As can be seen, boehmite alumina can be used to replace HEC partially and maintain viscosity profiles for the overall formulation in an exterior house paint. As can also be seen from FIG. 3, the formulation containing the boehmite alumina exhibits enhanced shear thinning, making it easier to apply by techniques such as spraying.

EXAMPLE 4

This example demonstrates the use of boehmite alumina as a total replacement for a clay thickener and a partial replacement for an Associative Thickener in an Exterior (modified-acrylic) Quality High Build House Paint—White. The formulations are shown in Table 4 below.

TABLE 4

| | QR-708 + ATTAGEL-50 | | QR-708 + ALUMINA | |
|---|---|---|---|---|
| Batch Size: Ingredient | 100 Gal. Formula Lbs. | w/w % | 100 Gal. Formula Lbs. | w/w % |
| PIGMENT GRIND | | | | |
| DI Water | 160.8 | 13.83 | 160.8 | 13.85 |
| DISPERAL SOL P2 | | | 5.5 | 0.47 |
| Propylene Glycol | 34.1 | 2.93 | 34.1 | 2.94 |
| Byk VP-155 | 6.8 | 0.58 | 6.8 | 0.59 |
| KTPP | 1.0 | 0.09 | 1.0 | 0.09 |
| Triton N-57[1] | 1.1 | 0.09 | 1.1 | 0.09 |
| Colloid 640 | 1.0 | 0.09 | 1.0 | 0.09 |
| Nuosept 145 | 2.0 | 0.17 | 2.0 | 0.17 |
| Nuocide 960[2] | 7.0 | 0.60 | 7.0 | 0.60 |
| Ti-Pure R-902[3] | 225.0 | 19.34 | 225.0 | 19.39 |
| Nytal 300[4] | 100.0 | 8.60 | 100.0 | 8.62 |
| Minex 7 | 100.0 | 8.60 | 100.0 | 8.62 |
| Attagel 50[5] | 3.0 | 0.26 | | |
| LETDOWN | | | | |
| DI Water | 104.4 | 8.98 | 104.4 | 9.00 |
| QR-708 | 13.5 | 1.16 | 8.5 | 0.73 |
| UCAR Acrylic 516 | 384.0 | 33.02 | 384.0 | 33.09 |
| Texanol | 15.8 | 1.36 | 15.8 | 1.36 |
| Colloid 640 | 1.8 | 0.15 | 1.8 | 0.16 |
| Ammonium Hydroxide, 28% | 1.8 | 0.15 | 1.8 | 0.16 |
| TOTAL | 1163.1 | 100.0 | 1160.6 | |

[1]Nonionic surfactant (alkylaryl polyether alcohols), marketed by Union Carbide.
[2]Chlorinated aromatic nitrile (biocide) made by Huls America Inc.
[3]Titanium dioxide, 91 % min. (AIO,), marketed by DuPont.
[4]Silicon dioxide, marketed by R.T. Vanderbilt Co., Inc.
[5]Magnesium aluminum silicate, marketed by Engelhard.

Bohlin rheology curves are shown for the formulations in Table 4. As can be seen, the curves demonstrate that boehmite alumina can be used to completely replace the clay thickener and partially replace the Associative Thickener while maintaining similar viscosity profiles for the final formulations in an exterior architectural paint formulation.

EXAMPLE 5

The physical properties of various boehmite aluminas are listed in Table 5 below.

TABLE 5

| | ALUMINA PHYSICAL PROPERTIES | | | | | |
|---|---|---|---|---|---|---|
| Alumina Alumina | DISPERAL ® SOL P2 | DISPAL ®[1] 23N4-20 | DISPAL ®[2] 11N7-12 | CATAPAL ®[3] D | DISPERAL ®[4] S | DISPERAL ®[5] CLASSIC |
| Crystallite Size, (Å), 020 | 33 | 55 | 210 | 47 | 65 | 74 |
| Surface Area, | 301 | 230 | 110 | 250 | 190 | 175 |

TABLE 5-continued

| | ALUMINA PHYSICAL PROPERTIES | | | | | |
|---|---|---|---|---|---|---|
| Alumina | DISPERAL® | DISPAL®[1] | DISPAL®[2] | CATAPAL®[3] | DISPERAL®[4] | DISPERAL®[5] |
| Alumina | SOL P2 | 23N4-20 | 11N7-12 | D | S | CLASSIC |
| ($m^2$/g calc. | | | | | | |
| Water | 98.4 | >98 | <15(Requires | <15 (Requires | <15 (Requires | |
| Dispersibility | | | | Acid to Disp.) | Acid to Disp.) | Acid to Disp.) |
| (%) | | | | | | |

[1,2]Water-dispersible boehmite aluminas marketed by Vista Chemical Co.
[3]Acid-dispersible boehmite aluminas marketed by Vista Chemical Co.
[4,5]Acid-dispersible boehmite aluminas marketed by Condea Chemie G.m.b.H.

The boehmite aluminas listed in Table 5 were used as thickeners in a Good Quality Flat Wall Paint—White formulation. The formulations made using the alumina thickeners were compared with a formulation that used HEC as the thickener. In all cases wherein the alumina thickener was used, it was present in an amount of 2.7 times the amount of HEC used in the corresponding formulation. The formulation in which the thickener is HEC is shown in Table 6 below.

TABLE 6

| INGREDIENTS | w % |
|---|---|
| PIGMENT GRIND | |
| Water | 27.75 |
| Preservative[1] | 0.20 |
| Cellulose QP-15,000 | 0.42 |
| Dispersant[2] | 0.31 |
| Potassium Tripolyphosphate (KTPP) | 0.17 |
| Nonionic Surfactant[3] | 0.17 |
| Antifoam[4] | 0.16 |
| Propylene Glycol | 2.38 |
| Titanium Dioxide[5] | 19.14 |
| Clay[6] | 8.51 |
| Silica[7] | 8.51 |
| Silica[8] | 2.13 |
| LETDOWN | |
| UCAR Acrylic 516 | 28.58 |
| Coalescing Aid[9] | 1.18 |
| Antifoam[4] | 0.16 |
| Ammonium Hydroxide, 28% Aqueous Solution | 0.15 |
| TOTAL | 100% |

[1]NUOSEPT 145.
[2]"Colloid" 111 (Rhone-Poulenc) or equivalent.
[3]"Triton" N-101 (Union Carbide) or equivalent.
[4]"Patcote" 803 (Patco Specially) or equivalent.
[5]"Ti-Pure" R-900 (DuPont) or equivalent.
[6]"Altowhite" TE (Dry Branch Knolin Co.) or equivalent.
[7]MIN-U-SIL 40.
[8]"Celite" 499 (Johns Manville) or equivalent.
[9]"Texanol" (Eastman) or equivalent.

Figure 5:
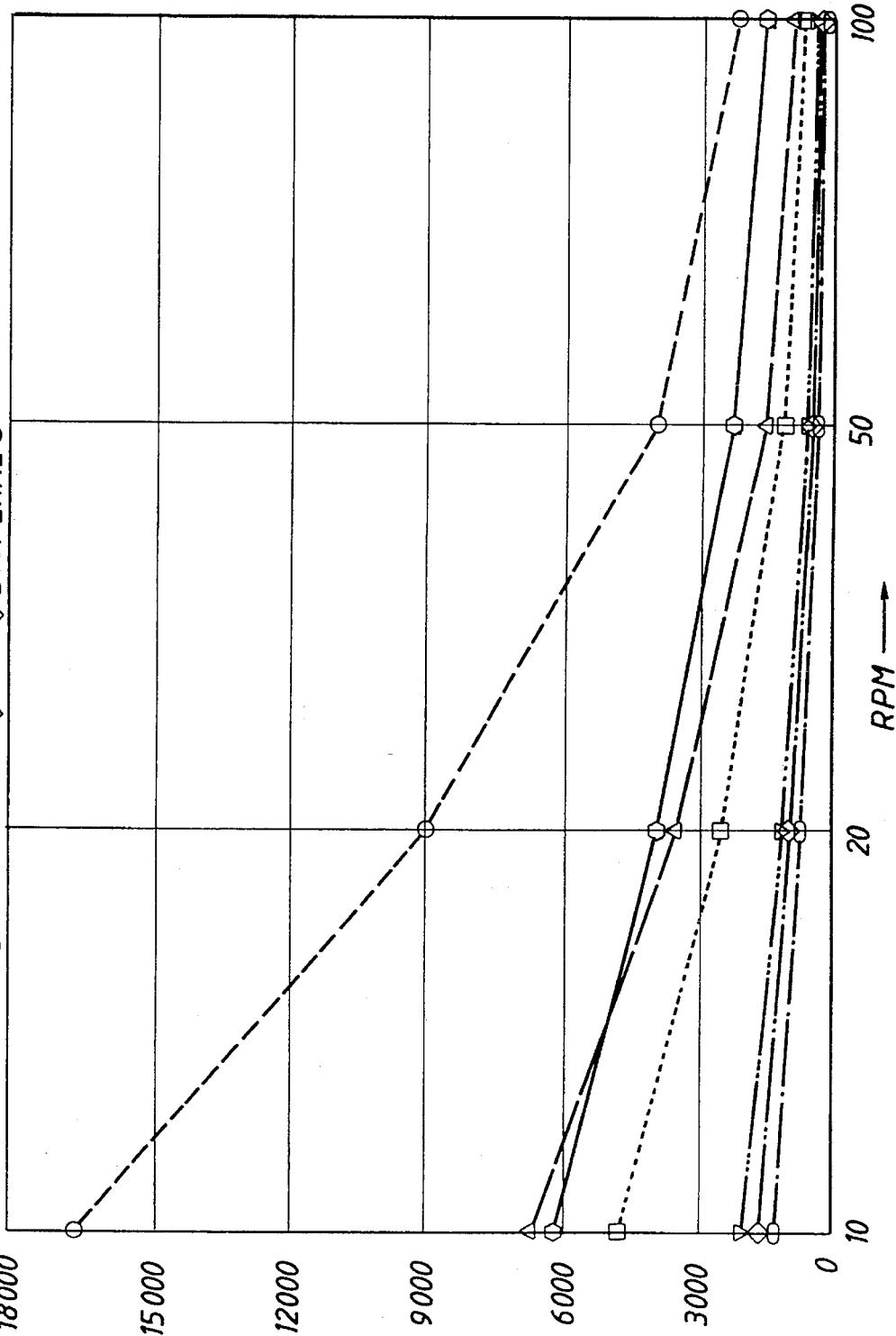
FIG. 5 is a graph showing a comparison of the thickening ability of various boehmite aluminas versus HEC in a Good Quality Flat Wall Paint—White.

The latex paints containing the various aluminas and HEC were subjected to Brookfield viscosity measurements. The results are shown in FIG. 5. As can be seen from FIG. 5, aluminas wherein the crystallite size (020 plane) is less than about 60 Angstroms and the surface area (calcined) is greater than about 200 $m^2$/g show comparable or better rheology characteristics than HEC. In particular, note that aluminas wherein the crystallite size (020 plane) is less than about 40 Angstroms and the surface area (when calcined to the gamma phase) is greater than about 250 $m^2$/g show superior rheological properties as compared to HEC, albeit at a higher loading.

Although as shown in FIG. 5 the required loading of the boehmite alumina thickeners is significantly larger than that of HEC in a comparable latex paint, the other benefits achieved by using boehmite alumina as compared with HEC offset this loading differential. It has been found that latex paints made using boehmite aluminas, even as partial thickener replacements, are much easier to clean up than latex paints containing only HEC, clays or Associative Thickeners. It is also believed that, unlike HEC and some Associative Thickeners, boehmite alumina thickeners are not subject to biodegradability. As demonstrated above, the incorporation of boehmite alumina in latex paints enhances shear thinning, presumably making such latex paints easier to apply with sprayers without dilution. Lastly, because of the intrinsic nature of boehmite alumina as compared to Associative Thickeners or HEC, latex paints employing boehmite aluminas as thickeners are expected to exhibit good scrubbability, i.e., they are more durable when subjected to washing or scrubbing.

The foregoing description and examples illustrate selected embodiments of the present invention. In light thereof, variations and modifications will be suggested to one skilled in the art, all of which are in the spirit and purview of this invention.

What is claimed is:

1. A latex composition comprising, as a rheology modifier, a boehmite alumina having a crystallite size (020 plane) of less than about 60 Angstroms and a surface area, when calcined to gamma phase, of greater than about 250 $m^2$/g, said boehmite alumina being present in an amount of from about 0.1 to about 5% by weight of said latex composition and being of a type that does not require acid for dispersibility.

2. The composition of claim 1 wherein said latex composition comprises a latex paint.

3. The composition of claim 2 including an additional rheology modifier.

4. The composition of claim 3 wherein said additional rheology modifier comprises a cellulosic thickener.

5. The composition of claim 4 wherein said additional rheology modifier comprises hydroxyethyl cellulose.

6. The composition of claim 3 wherein said additional rheology modifier comprises an inorganic material that exhibits rheological properties in an aqueous medium.

7. The composition of claim 6 wherein said additional rheology modifier comprises a clay.

8. The composition of claim 3 wherein said additional rheology modifier comprises a polymeric material dispersed in a water-compatible carrier liquid.

9. The composition of claim 1 wherein said boehmite alumina has a crystallite size of less than about 40 Angstroms.

\* \* \* \* \*